US012276207B2

(12) United States Patent
Watanabe et al.

(10) Patent No.: US 12,276,207 B2
(45) Date of Patent: Apr. 15, 2025

(54) HIGH-TEMPERATURE PART AND GAS TURBINE INCLUDING THE SAME

(71) Applicant: MITSUBISHI HEAVY INDUSTRIES, LTD., Tokyo (JP)

(72) Inventors: Masahiro Watanabe, Tokyo (JP); Taiki Kinoshita, Tokyo (JP); Kiyoshi Fujimoto, Tokyo (JP); Sosuke Nakamura, Tokyo (JP); Norihiko Motoyama, Tokyo (JP); Kenichi Hashimoto, Tokyo (JP); Akito Kira, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/197,231

(22) Filed: May 15, 2023

(65) Prior Publication Data

US 2023/0374906 A1 Nov. 23, 2023

(30) Foreign Application Priority Data

May 19, 2022 (JP) ................................ 2022-082124

(51) Int. Cl.
*F01D 5/28* (2006.01)
*F01D 11/00* (2006.01)

(52) U.S. Cl.
CPC ............ *F01D 5/288* (2013.01); *F01D 11/003* (2013.01); *F05D 2230/90* (2013.01); *F05D 2300/611* (2013.01)

(58) Field of Classification Search
CPC .... F01D 5/288; F01D 11/003; F05D 2230/90; F05D 2300/611
See application file for complete search history.

(56) References Cited

U.S. PATENT DOCUMENTS

2007/0298270 A1* 12/2007 Hazel ...................... C23C 26/00 428/701
2023/0042434 A1 2/2023 Taniguchi et al.

FOREIGN PATENT DOCUMENTS

JP 2021-131041 9/2021

* cited by examiner

*Primary Examiner* — Courtney D Heinle
*Assistant Examiner* — Andrew Thanh Bui
(74) *Attorney, Agent, or Firm* — Wenderoth, Lind & Ponack, L.L.P.

(57) ABSTRACT

A high-temperature part of the present disclosure includes: a high-temperature part body which includes a base and a coating layer formed on a part of a surface of the base; and a protective layer which is formed on at least a part of a surface of the coating layer. The protective layer is formed of a material which is allowed to disappear from a surface of the coating layer under an operation environment of a gas turbine.

4 Claims, 6 Drawing Sheets

HIGH-TEMPERATURE PART AND GAS TURBINE INCLUDING THE SAME

FIELD OF THE INVENTION

The present disclosure relates to a high-temperature part which is allowed to be exposed to a combustion gas and a gas turbine including the same.

Priority is claimed on Japanese Patent Application No. 2022-082124, filed on May 19, 2022, the content of which is incorporated herein by reference.

DESCRIPTION OF RELATED ART

A gas turbine includes a compressor which compresses air to produce compressed air, a combustor which bus fuel in the compressed air to produce a combustion gas, a turbine which is driven by the combustion gas, and an intermediate casing. The compressor includes a compressor rotor which rotates about an axis and a compressor casing which covers the compressor rotor. The combustor includes a burner which injects fuel and a transition piece (or a combustion cylinder) which sends the combustion gas produced by the combustion of the fuel to the turbine. The turbine includes a turbine rotor which rotates about an axis, a turbine casing which covers the turbine rotor, and a plurality of stator vane rows. The turbine rotor includes a rotor shaft which rotates about an axis and a plurality of rotor blade rows which are attached to the rotor shaft. The plurality of rotor blade rows are arranged in an axial direction in which an axis extends. Each rotor blade row includes a plurality of rotor blades which are arranged in a circumferential direction around an axis. The plurality of stator vane rows are arranged in an axial direction and are attached to an inner peripheral side of the turbine casing. Each of the plurality of stator vane rows is disposed on an axial upstream side of any one rotor blade row of the plurality of rotor blade rows. Each stator vane row includes a plurality of stator vanes which are arranged in a circumferential direction around an axis. The turbine casing includes a split ring. The split ring is axially disposed between the plurality of stator vane rows and defines an outer peripheral side of a combustion gas flow path through which the combustion gas flows in the turbine.

The compressor casing and the turbine casing are connected through the intermediate casing. The combustor is attached to the intermediate casing. The transition piece of the combustor is disposed inside the intermediate casing. The compressed air from the compressor is discharged into the intermediate casing. The compressed air flows into the combustor and is used for the combustion of the fuel.

An outlet flange of the transition piece and a shroud of the first stage stator vane constituting the stator vane row on the most axial upstream side in the plurality of stator vane rows are connected by an outlet seal (or a combustion cylinder seal).

All of the transition piece, the outlet seal, the stator vane, the split ring, and the rotor blade in the above-described component parts of the gas turbine are the high-temperature parts exposed to the combustion gas.

Japanese Unexamined Patent Application No. 2021-131041 discloses an outlet seal which is a kind of high-temperature part. The outlet seal includes a body portion which defines a part of a combustion gas flow path, a transition piece connection portion to which an outlet flange of a transition piece is connected, and a stator vane connection portion to which a shroud of a first stage stator vane is connected. The transition piece connection portion is provided on the axial upstream side of the body portion. The stator vane connection portion is provided on the axial downstream side of the body portion. The outlet seal includes a base and a heat insulating coat covering a part of the surface of the base. The heat insulating coat is formed on a surface of a flow path forming portion which is a portion forming the body portion in the base.

SUMMARY OF THE INVENTION

The high-temperature part such as the outlet seal may come into contact with other adjacent parts during an assembly step of the gas turbine and the heat insulating coat of the high-temperature part may be damaged.

Here, an object of the present disclosure is to provide a high-temperature part capable of suppressing damage of a gas turbine in an assembly step.

A high-temperature part of an aspect according to the invention for achieving the above-described object is a high-temperature part of a gas turbine exposed to a combustion gas including: a high-temperature part body which includes a base and a coating layer formed on a part of a surface of the base; and a protective layer which is formed on at least a part of a surface of the coating layer. The protective layer is formed of a material which is allowed to disappear from the surface of the coating layer under an operation environment of the gas turbine.

In this aspect, since the coating layer is protected by the protective layer when the gas turbine is assembled by using the high-temperature part, it is possible to suppress damage of the coating layer. Further, in this aspect, when the combustion gas contacts the high-temperature pan by operation of the gas turbine, the protective layer in the high-temperature part disappears from the surface of the coating layer due to the heat of the combustion gas. Therefore, even when the high-temperature part of this aspect includes a protective layer, there is no influence on the performance of the gas turbine.

A gas turbine according to the invention for achieving the above-described object includes: a high-temperature part of the gas turbine according to the above-described aspect; and a plurality of other parts not exposed to a combustion gas. The plurality of other parts include all parts constituting a compressor of the gas turbine and parts forming an outer shape of a turbine of the gas turbine.

A method of operating a high-temperature pan of a gas turbine according to the invention for achieving the above-described object is a method of operating a high-temperature part of a gas turbine exposed to a combustion gas, the method including: a preparation step of preparing a high-temperature part including a high-temperature part body and a protective layer formed on at least a part of a surface of the high-temperature part body; an assembly step of assembling a gas turbine by using the high-temperature part and a plurality of other parts; and an operation step of producing a combustion gas by supplying fuel to the gas turbine. The high-temperature part body includes a base and a coating layer formed on a part of a surface of the base. The protective layer is formed on at least a part of a surface of the coating layer. The protective layer is formed of a material which is allowed to disappear from the surface of the coating layer under an operation environment of the gas turbine. The protective layer disappears from the surface of the coating layer due to the influence of heat of the combustion gas during the operation step.

In this aspect, it is possible to suppress damage of the high-temperature part body during the assembly step. Further, when the combustion gas contacts the high-temperature pan by performing the operation step, the protective layer in the high-temperature part can disappear.

According to one aspect of the present disclosure, it is possible to suppress of the high-temperature part when assembling the gas turbine using the high-temperature part.

DETAILED DESCRIPTION OF THE INVENTION

Hereinafter, an embodiment according to the present disclosure will be described in detail with reference to the drawings.

"Embodiment of Gas Turbine"

An embodiment of a gas turbine will be described with reference to FIGS. 1 to 4.

Figure 1:
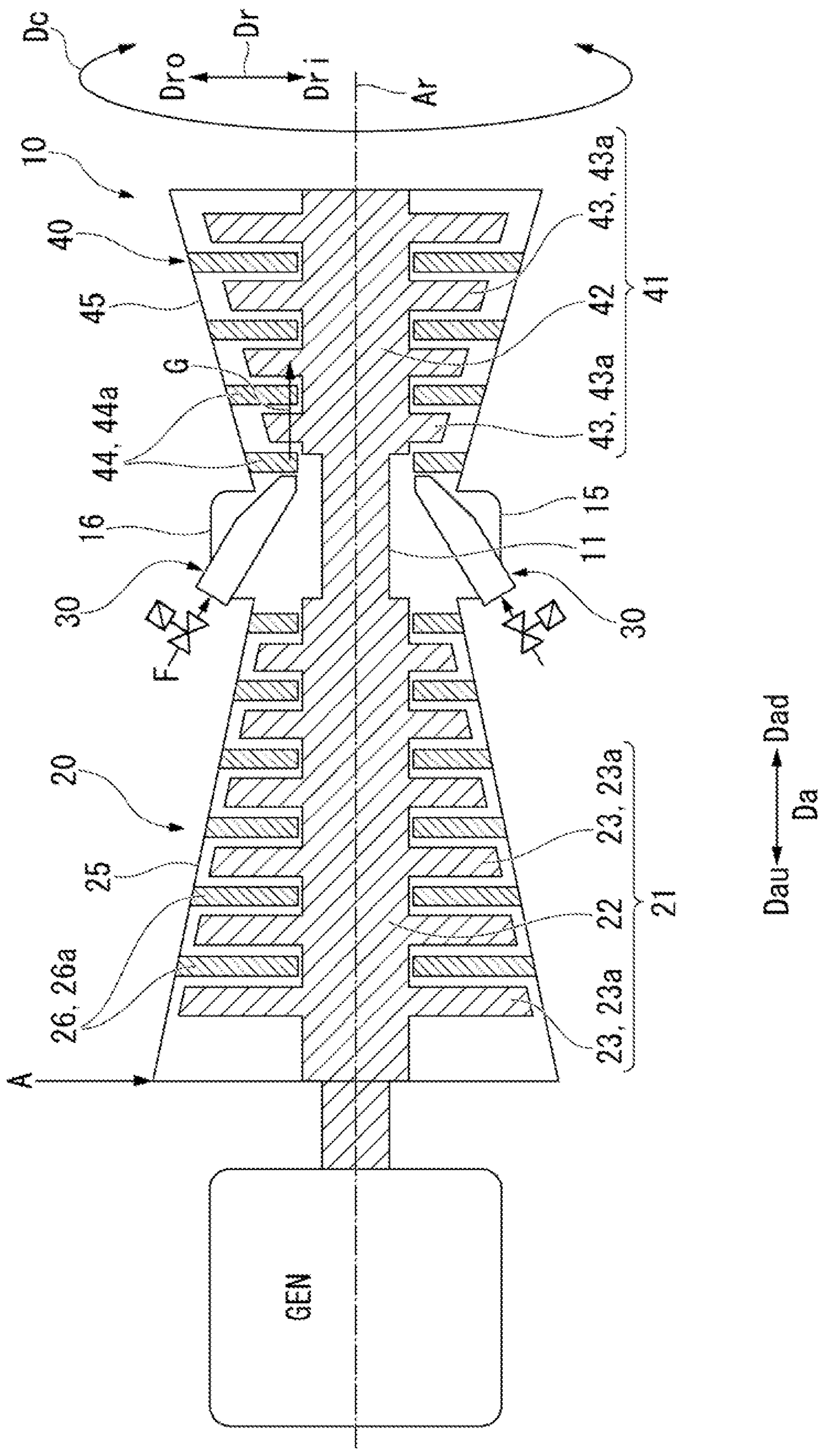
FIG. 1 is a schematic cross-sectional view of a gas turbine of an embodiment according to the present invention.

As shown in FIG. 1, a gas turbine 10 of the embodiment includes a compressor which compresses air A, a plurality of combustors 30 which produces a combustion gas G by burning a fuel F in air A compressed by the compressor 20, and a turbine 40 which is driven by the combustion gas G.

The compressor 20 includes a compressor rotor 21 which rotates about an axis Ar, a compressor casing 25 which covers the compressor rotor 21, and a plurality of stator vane rows 26. The turbine 40 includes a turbine rotor 41 which rotates about the axis Ar, a turbine casing 45 which covers the turbine rotor 41, and a plurality of stator vane rows 44. Additionally, hereinafter, the extension direction of the axis Ar is referred to as the axial direction Da, the circumferential direction about the axis Ar is simply referred to as the circumferential direction Dc. and the direction perpendicular to the axis Ar is referred to as the radial direction Dr. Further, one side of the axial direction Dra is referred to as the axial upstream side Dau and the opposite side is referred to as the axial downstream side Dad. Further, the side closer to the axis Ar in the radial direction Dr is referred to as the radial inside Dri and the opposite side is referred to as the radial outside Dro.

The compressor 20 is disposed on the axial upstream side Dau with respect to the turbine 40.

The compressor rotor 21 and the turbine rotor 41 are located on the same axis Ar and are connected to each other to form a gas turbine rotor 11. For example, a rotor of a generator GEN is connected to the gas turbine rotor 11. The gas turbine 10 further includes an intermediate casing 16. This intermediate casing 16 is disposed between the compressor casing 25 and the turbine casing 45 in the axial direction Da. The compressor casing 25, the intermediate casing 16, and the turbine casing 45 are connected to each other to form a gas turbine casing 15.

Figure 2:
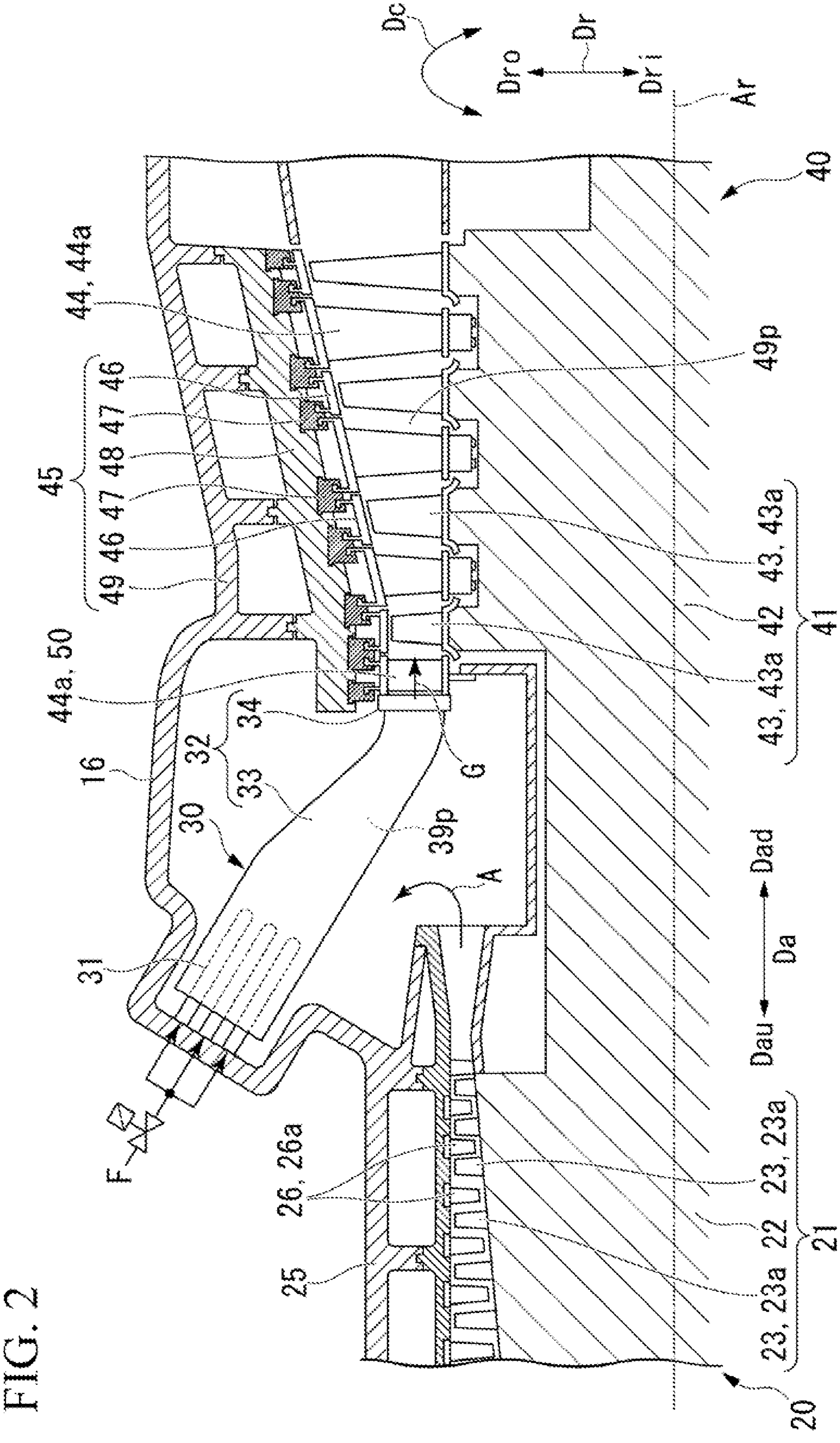
FIG. 2 is a main cross-sectional view of the gas turbine of an embodiment according to the present invention.

As shown in FIGS. 1 and 2, the compressor rotor 21 includes a rotor shaft 22 which extends in the axial direction Da around the axis Ar and a plurality of rotor blade rows 23 which are attached to the rotor shaft 22. The plurality of rotor blade rows 23 are arranged in the axial direction Da. Each rotor blade row 23 includes a plurality of rotor blades 23*a* which are arranged in the circumferential direction Dc. Any one stator vane row 26 of the plurality of stator vane rows 26 is disposed on each axial downstream side Dad of the plurality of rotor blade rows 23. Each stator vane row 26 is provided inside the compressor casing 25. Each stator vane row 26 includes a plurality of stator vanes 26*a* which am arranged in the circumferential direction Dc.

The turbine rotor 41 includes a rotor shaft 42 which extends in the axial direction Da around the axis Ar and a plurality of rotor blade rows 43 which are attached to the rotor shaft 42. The plurality of rotor blade rows 43 are arranged in the axial direction Da. Each rotor blade row 43 includes a plurality of rotor blades 43*a* which are arranged in the circumferential direction Dc. Any one stator vane row 44 of the plurality of stator vane rows 44 is disposed on each axial upstream side Dau of the plurality of rotor blade rows 43. Each stator vane row 44 is provided inside the turbine casing 45. Each stator vane row 44 includes a plurality of stator vanes 44*a* which are arranged in the circumferential direction Dc.

An annular space which is located between the outer peripheral side of the rotor shaft 42 and the inner peripheral side of the turbine casing 45 and in which the stator vane 44*a* and the rotor blade 43*a* are arranged in the axial direction Da forms a combustion gas flow path 49*p* through which a combustion gas G flows from the combustor 30. This combustion gas flow path 49*p* has an annular shape centered on the axis Ar and is elongated in the axial direction Da.

The turbine casing 45 includes a plurality of split rings 46, a plurality of heat insulating rings 47, a Vane ring 48, and a turbine casing body 49. The split ring 46 is located on the radial outside Dro of the rotor blade row 43 and faces the rotor blade row 43 in the radial direction Dr. The Vane ring 48 has an annular shape centered on the axis Ar and is located on the radial outside Dro of the plurality of split rings 46 or the stator vane 44*a*. One heat insulating ring 47 of the plurality of heat insulating rings 47 is located between the split ring 46 and the Vane ring 48 in the radial direction Dr and connects the split ring 46 and the Vane ring 48. Further, the remaining heat insulating rings 47 of the plurality of heat insulating rings 47 are located between the stator vane 44*a* and the Vane ring 48 in the radial direction Dr and connect the stator vane 44*a* and the Vane ring 48. The Vane ring 48 is fixed to the inner peripheral side of the turbine casing body 49.

The plurality of combustors 30 are arranged in the circumferential direction Dc around the axis Ar and are attached to the intermediate casing 16. The combustor 30 includes a transition piece (or a combustion cylinder) 32 in which the fuel F is combusted and a plurality of burners 31 which inject fuel into the transition piece 32. The inner peripheral side of the transition piece 32 forms a combustion space (or a combustion gas flow path) 39*p*. The transition piece 32 extends in a direction including a directional component of the axial downstream side Dad while the combustor 30 is attached to the intermediate casing 16.

Figure 3:
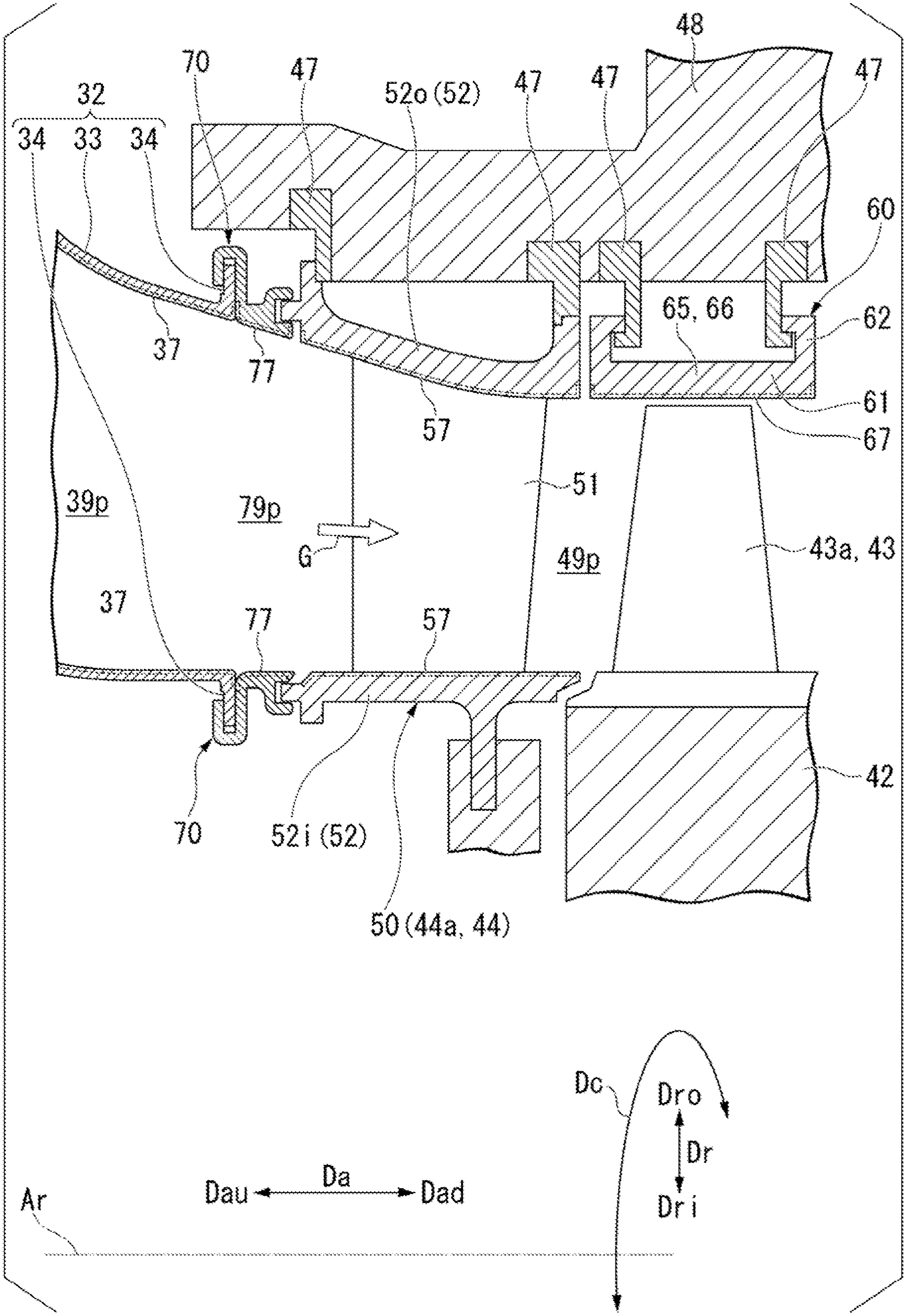
FIG. 3 is a view showing a cross-section of a downstream portion of a combustor, an outlet seal, and an upstream portion of the turbine of an embodiment according to the present invention.

As shown in FIG. 3, the transition piece 32 and the stator vane 44*a* constituting the stator vane row 44 on the most axial upstream side Dau among the plurality of stator vane rows 44 are connected by an outlet seal 70. Additionally, hereinafter, the first stage stator vane 44*a* is simply referred to as a stator vane 50. Further, the first stage split ring 46 adjacent to the axial downstream side Dad of the stator vane 50 is simply referred to as a split ring 60.

The stator vane 50 includes a Vane body 51 which has an airfoil-shape cross-section and a shroud 52 which is provided on both sides of the Vane body 51 in the height direction of the vane. Additionally, the shroud 52 which is provided on one side of the Vane body 51 in the height direction of the vane is an inner shroud 52*i* and the shroud 52 which is provided on the other side of the Vane body 51 in the height direction of the vane is an outer shroud 52*o*. Both the inner shroud 52*i* and the outer shroud 52*o* spread in a direction perpendicular to the height direction of the vane. In a state in which the stator vane 50 is attached to the turbine casing 45, the height direction of the vane is the radial direction Dr. Further, one side of the height direction of the vane is the radial outside Dro and the other side of the height direction of the vane is the radial inside Dri. Thus, the inner shroud 52*i* is provided on the radial inside Dri of the Vane body 51 and the outer shroud 52*o* is provided on the radial outside Dro of the Vane body 51. The inner shroud 52*i* defines a part of an edge on the radial inside Dri of the combustion gas flow path 49*p*. The outer shroud 52*o* defines an edge on the radial outside Dro of the combustion gas flow path 49*p*. The Vane body 51 which is located between the inner shroud 52*i* and the outer shroud 52*o* in the radial direction Dr is located in the combustion gas flow path 49*p* through which the combustion gas G passes.

Figure 4:
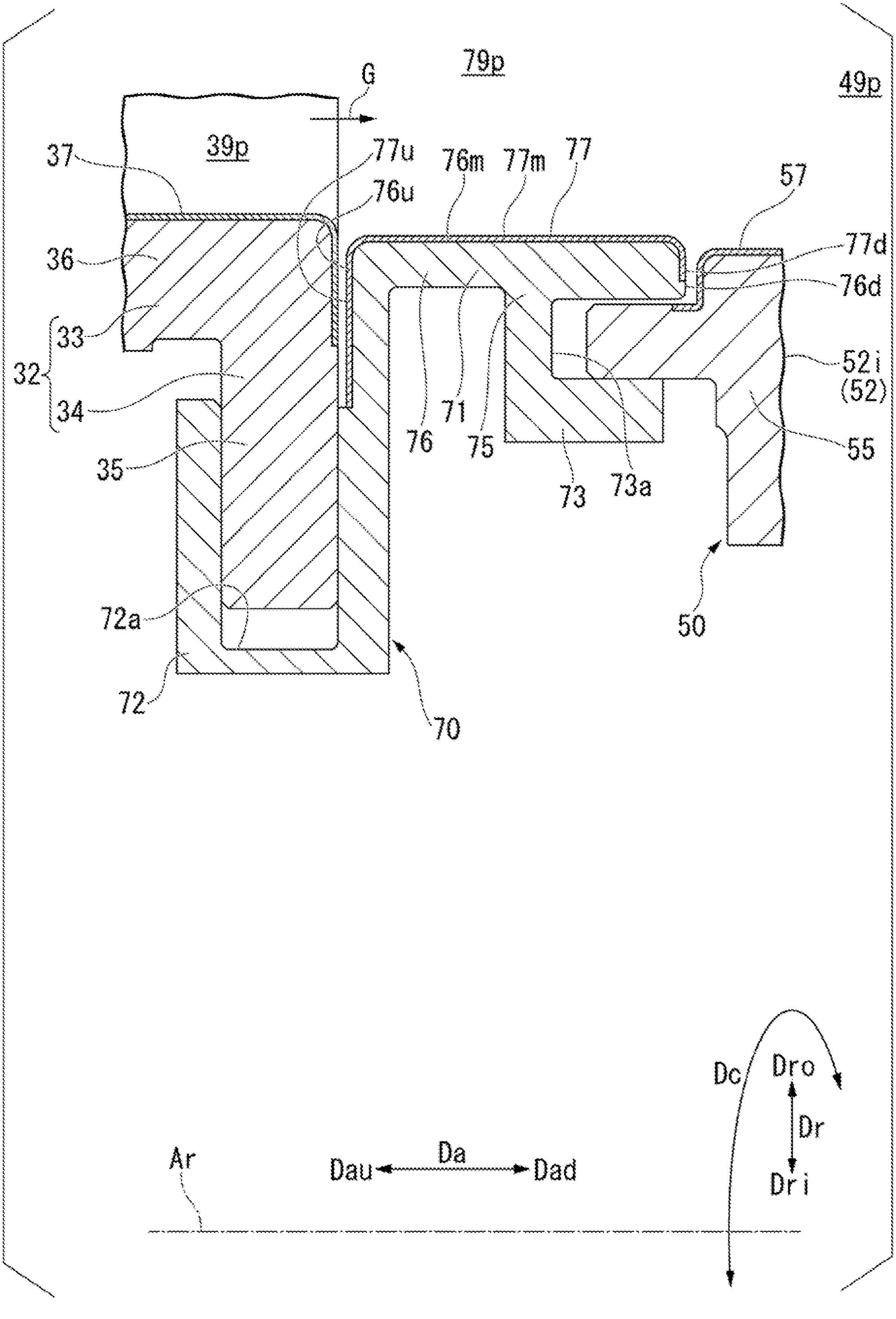
FIG. 4 is a cross-sectional view around the outlet seal of an embodiment according to the present invention.

As shown in FIG. 4, the stator vane 50 includes a base 55 and a coating layer 57 which is formed on a part of the surface of the base 55. A portion forming the shroud 52 in the base 55 forms a flow path forming portion 56. The base 55 is formed of, for example, a nickel-based alloy. The coating layer 57 includes a bond coat layer formed on the surface of the base 55 and a top coat layer formed on the surface of the bond coat layer. The bond coat layer is formed of, for example, metal such as CoNiCrAlY. Further, the bond coat layer is formed of, for example, a $ZrO_2$-based ceramic.

As shown in FIG. 3, the transition piece 32 includes a cylinder 33 which defines a combustion space 39*p* and two outlet flanges 34 which are provided at an end on the axial downstream side Dad of the cylinder 33. One outlet flange 34 of two outlet flanges 34 is a portion on the radial outside Dro of the cylinder 33 and is provided at an end on the axial downstream side Dad. Further, the other outlet flange 34 is a portion on the radial inside Dri of the cylinder 33 and is provided at an end on the axial downstream side Dad.

As shown in FIG. 4, the transition piece 32 includes a base 35 and a coating layer 37 which is formed on a part of the surface of the base 35. A portion forming the cylinder 33 in the base 35 forms a flow path forming portion 36.

As shown in FIG. 3, the split ring 60 includes a split ring body 61 which defines a part of an edge on the radial outside Dro of the combustion gas flow path 49*p* and a hook portion 62 which is provided on the radial outside Dro of the split ring body 61. A part of the heat insulating ring 47 is hooked on the hook portion 62.

The split ring 60 also includes a base 65 and a coating layer 67 which is formed on a part of the surface of the base 65 similarly to the stator vane 50 or the transition piece 32. A portion forming the split ring body 61 in the base 65 forms the flow path forming portion 66.

As shown in FIG. 4, the outlet seal 70 includes a body portion 71, a transition piece connection portion 72, and a stator vane connection portion 73 which define a combustion gas flow path 79*p* serving as a flow path of a combustion gas flowing from the transition piece 32 to the stator vane 50. The body portion 71 spreads in a direction including the axial direction Da and a direction including the circumferential direction Dc. The transition piece connection portion 72 is provided at an end on the axial upstream side Dau of the body portion 71. The transition piece connection portion 72 is provided with a flange fitting groove 72*a* into which the outlet flange 34 of the transition piece 32 is inserted. The stator vane connection portion 73 is provided at an end on the axial downstream side Dad of the body portion 71. The stator vane connection portion 73 is provided with a shroud fitting groove 73*a* into which a part of the shroud 52 of the stator vane 50 is inserted.

The outlet seal 70 also includes a base 75 and a coating layer 77 which is formed on a part of the surface of the base 75 similarly to the stator vane 50 and the like. A portion forming the body portion 71 in the base 75 forms a flow path forming portion 76.

The flow path forming portion 76 includes a flow path defining surface 76*m* which defines a part of the combustion gas flow path 79*p*, a downstream end surface 76*d* which is connected to an edge on the axial downstream side Dad of the flow path defining surface 76*m*, and an upstream end surface 76*u* which is connected to an edge on the axial upstream side Dau of the flow path defining surface 76*m*.

The coating layer 77 includes a main coating portion 77*m* which is formed on the flow path defining surface 76*m*, a downstream coating portion 77*d* which is formed on the downstream end surface 76*d* to be connected to the main coating portion 77*m*, and an upstream coating portion 77*u* which is formed on the upstream end surface 76*u* to be connected to the main coating portion 77*m*.

"Embodiment of High-Temperature Part"

An embodiment of the high-temperature part will be described with reference to FIGS. 5 and 6.

Figure 5:
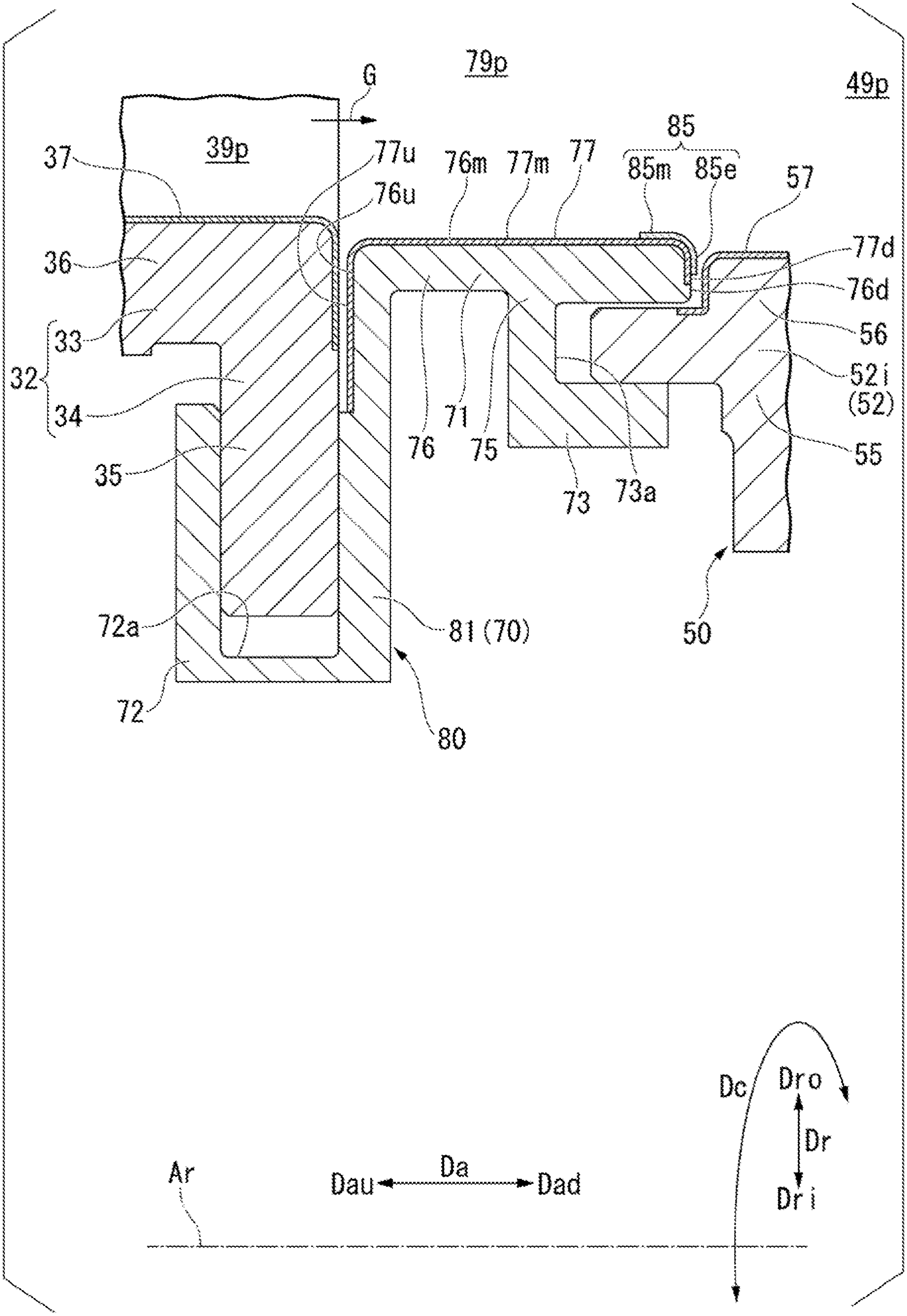
FIG. 5 is a cross-sectional view around a high-temperature part of an embodiment according to the present invention.
Figure 6:
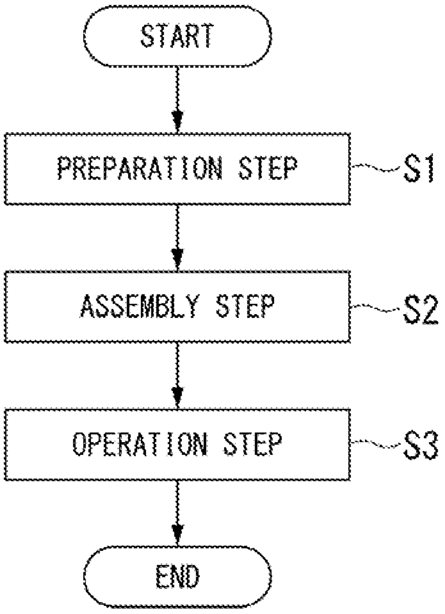
FIG. 6 is a flowchart showing a method of operating the high-temperature part of an embodiment according to the present invention.

As shown in FIG. 5, a high-temperature part 80 of this embodiment includes a high-temperature part body 81 and a protective layer 85 formed on the surface of the high-temperature part body 81. The high-temperature part body 81 of this embodiment is the above-described outlet seal 70.

The protective layer 85 includes an end surface protection portion 85*e* and a main protection portion 85*m*. The end surface protection portion 85*e* is formed on the surface of the downstream coating portion 774 in the outlet seal 70 which is the high-temperature part body 81. The main protection portion 85*m* is formed on the surface of the main coating portion 77*m* to be connected to the end surface protection portion 85*e*.

The protective layer 85 has a property that the protective layer adheres to the surface of the high-temperature part 80 and disappears due to the temperature by heat or the combustion by heat during a normal operation of the gas turbine 10. Further, the protective layer 85 preferably has a certain level of elasticity. Examples of such a protective layer 85 include the following protective layer forming materials.

(1) Resin material mainly composed of ethylene-vinyl acetate (EVA) resin (for example, product name "LOCLTITE hot melt")

(2) Membrane material in which a pressure-sensitive adhesive is applied to an acrylic ionomer film (for example, product name "Smart Seal Tape")

(3) Tape with acrylic adhesive applied to polyolefin foam (for example, product name "Nitoms super strong double-sided tape No. 577")

(4) Adhesives mainly composed of α-cyanoacrylate (for example, "instant Adhesive" Aron Alpha (registered trademark)

(5) Adhesives mainly composed of polyester resin (for example, "VYLOSHOT" (registered trademark)

All of the protective layer forming materials provided as exemplary examples above are resins or materials containing resins as main components. In the protective layer forming materials containing resins as main components, for example, the residual component may be metal powder or the like.

Since the coating layer 77 formed on the surface of the outlet seal 70 which is the high-temperature part body 81 is very hard, the coating is vulnerable to impact. Therefore, for example, if the outlet seal 70 collides with the stator vane 50 when the outlet seal 70 is assembled to the stator vane 50, the coating layer 77 may be damaged.

When the outlet seal 70 is assembled to the stator vane 50, there is a high possibility that the main coating portion 77*m* and the downstream coating portion 77*d* of the outlet seal 70 and the periphery of the corner collide with the shroud 52 of the stator vane 50. Here, in this embodiment, in order to protect the main coating portion 77*m* and the downstream coating portion 77*d* of the outlet seal 70 and the periphery of the corner, the protective layer 85 is formed in the periphery of the corner.

Next, a method of operating the high-temperature part 80 will be described according to the flowchart shown in FIG. 6.

First, the above-described high-temperature part 80 is prepared (preparation step S1). Next, the gas turbine 10 is assembled by using the high-temperature part 80 and a plurality of other parts not exposed to the combustion gas G (assembly step S2). Additionally, the plurality of other parts not exposed to the combustion gas G are all parts constituting the compressor 20, the turbine casing body 49 corresponding to a part forming the outer shape of the turbine 40 among the parts constituting the turbine 40, and the like.

As described above, since the coating layer 77 in the high-temperature part 80 is protected by the protective layer 85, it is possible to suppress damage of the coating layer 77 in the high-temperature part 80 in the assembly step S2.

Next, the fuel F is supplied to the gas turbine 10 to produce the combustion gas G (operation step S3).

When the combustion gas 0 is once caused to contact the high-temperature part 80 by performing the operation step S3, the protective layer 85 in the high-temperature part 80 disappears from the surface of the coating layer 77 due to the heat of the combustion gas G.

Thus, even when the high-temperature part 80 includes the protective layer 85, there is no influence on the performance of the gas turbine 10.

The gas turbine 10 includes the high-temperature part. 80 at, the ending time point of the assembly step S2. However, since the protective layer 85 in the high-temperature part 80 disappears when the operation step S3 is first performed, the gas turbine 10 includes the high-temperature part body 81, but does not include the high-temperature part 80.

As described above, the protective layer 85 is formed in the periphery of the corner between the downstream coating portion 77*d* and the main coating portion 77*m* of the outlet seal 70 which is the high-temperature part body 81. However, the protective layer 85 may be formed in the periphery of the corner between the upstream coating portion 77*u* and the main coating portion 77*m* of the outlet seal 70 and the protective layer 85 may be formed in the periphery of both corners.

"Another Embodiment of High-Temperature Pan"

The high-temperature part 80 of the above-described embodiment is a pan including the outlet seal 70 as the high-temperature part body 81. However, the high-temperature part may use the transition piece 32, the stator vane 50, and the split ring 60 described above as the high-temperature part bodies. These high-temperature part bodies also include the bases 35, 55, and 65 and the mating layers 37, 57, and 67 similarly to the above-described outlet seal 70.

As described above, the base 35 of the transition piece 32, the base 55 of the stator vane 50, and the base 65 of the split ring 60 also include the flow path forming portions 36, 56, and 66 defining a part of the combustion gas flow paths 39*p* and 49*p* through which the combustion gas flows. These flow path funning portions 36, 56, and 66 also include the flow path defining surface, the downstream end surface, and the upstream end surface defining a part of the combustion gas flow paths 39*p* and 49*p* similarly to the flow path funning portion 76 of the outlet seal 70.

The coating layers 37, 57, and 67 are formed on a part of the surfaces of these flow path forming portions 36, 56, and 66. The coating layers 37, 57, and 67 include the main coating portion which is formed on the flow path defining surface, the downstream coating portion formed on the downstream end surface to be connected to the main coating portion, and the upstream coating portion formed on the upstream end surface to be connected to the main coating portion.

The high-temperature part can be made by forming the protective layer on the surface of the above-described high-temperature part body. The protective layers of these high-temperature parts also include the end surface protection portion and the main protection portion similarly to the above-described outlet seal 70. The end surface protection portion is formed any one of the downstream coating portion and the upstream coating portion. The main protection portion is formed on the main protection portion 85*m* to be connected to the end surface protection portion.

Even in the above-described high-temperature part, since the coating layers 37, 57, and 67 of the high-temperature part are protected by the protective layer, it is possible to suppress damage of the coating layers 37, 57, and 67 of the high-temperature pan during the assembly step S2.

APPENDIX

The high-temperature part 80 of the gas turbine 10 of the above-described embodiment is understood, for example, a below.

(1) A high-temperature part of a gas turbine of a first aspect is the high-temperature part 80 of the gas turbine 10 exposed to the combustion gas G including: the high-temperature part body 81 which includes the base 75 and the coating layer 77 formed on a part of the surface of the base 75; and the protective layer 85 which is formed on at least a part of the surface of the coating layer 77. The protective layer 85 is formed of a material which is allowed to disappear from the surface of the coating layer 77 under the operation environment of the gas turbine 10.

In this aspect, since the coating layer 77 is protected by the protective layer 85 when the gas turbine 10 is assembled by using the high-temperature part 80, damage of the coating layer 77 can be suppressed. Further, in this aspect, when the combustion gas G is once caused to contact the high-temperature part 80 by operation of the gas turbine 10, the protective layer 85 in the high-temperature part 80 disappears from the surface of the coating layer 77 due to the heat of the combustion gas G. Therefore, even when the high-temperature part 80 of this aspect includes the protective layer 85, there is no influence on the performance of the gas turbine 10.

(2) A high-temperature part of a gas turbine of a second aspect is the high-temperature part 80 of the gas turbine 10 of the first aspect, wherein the material forming the protective layer 85 is a resin or a material containing a resin as a main component.

In this aspect, since the material forming the protective layer 85 is a resin or a material containing a resin as a main component, the protective layer 85 can have a certain level of elasticity. Therefore, in this aspect, it is possible to further suppress damage of the coating layer 77 when the gas turbine 10 is assembled by using the high-temperature part 80. Further, in this aspect, the protective layer 85 can be combusted or sublimated at a relatively low temperature.

(3) A high-temperature part of a gas turbine of a third aspect is the high-temperature part 80 of the gas turbine 10 of the first aspect or the second aspect in which the base 75 includes the flow path forming portion 76 which defines a part of the combustion gas flow path 79*p* through which the combustion gas G flows. The flow path forming portion 76 includes the flow path defining surface 76*m* which defines a part of the combustion gas flow path 79*p*, the downstream end surface 76*d* which is an edge of the flow path defining surface 76*m* and is connected to an edge on the downstream side to which the combustion gas G flows, and the upstream end surface 76*u* which is an edge of the flow path defining surface 76*m* and is connected to an edge on the upstream side opposite to the downstream side. The coating layer 77 includes the main coating portion 77*m* which is formed on the flow path defining surface 76*m*, the downstream coating portion 77*d* which is formed on the downstream end surface 76*d* to be connected to the main coating portion 77*m*, and the upstream coating portion 77*u* which is formed on the upstream end surface 76*u* to be connected to the main coating portion 77*m*. The protective layer 85 includes the end surface protection portion 85*e* which is formed on any one surface of the downstream coating portion 77*d* and the upstream coating portion 77*u* and the main protection portion 85*m* which is formed on the surface of the main coating portion 77*m* to be connected to the end surface protection portion 85*e*.

In this aspect, when the gas turbine 10 is assembled by using the high-temperature part 80, it is possible to suppress damage in the periphery of the corner between the main coating portion 77*m* and the downstream coating portion 77*d* or the corner between the main coating portion 77*m* and the upstream coating portion 77*u* which is most likely to be impacted in the high-temperature part 80.

(4) A high-temperature part of a gas turbine of a fourth aspect is the high-temperature part 80 of the gas turbine 10 of any one of the first to third aspects and the high-temperature part body 81 is at least one of the transition pied 32, the stator vane 50, the outlet seal 70 and the split ring 60. The transition piece 32 is a component part of the combustor 30 of the gas turbine 10 and is a part defining the combustion space 39*p* in which the fuel F is combusted and the combustion gas G produced by the combustion of the fuel F flows. The stator vane 50 is a part disposed in the combustion gas flow path 49*p* through which the combustion gas G flows from the transition piece 32. The split ring 60 is a part which is disposed adjacent to the stator vane 50 and defines an edge of the combustion gas flow path 49*p* through which the combustion gas G flows from the transition piece 32.

The gas turbine 10 of the above-described embodiment is understood, for example, as below.

(5) A gas turbine of a fifth aspect includes: the high-temperature part 80 of the gas turbine 10 of any one of the first to fourth aspects; and a plurality of other parts not exposed to the combustion gas G. The plurality of other parts include all parts constituting the compressor 20 of the gas turbine 10 and parts terming an outer shape of a turbine of the gas turbine.

The method of operating the high-temperature part 80 of the gas turbine 10 of the above-described embodiment is understood, for example, as below.

(6) A high-temperature part of a gas turbine of a sixth aspect is a method of operating the high-temperature part 80 of the gas turbine 10 exposed to the combustion gas G including: the preparation step S1 of preparing the high-temperature part 80 including the high-temperature part body 81 and the protective layer 85 formed on at least a part of the surface of the high-temperature part body 81; the assembly step S2 of assembling the gas turbine 10 by using the high-temperature part 80 and a plurality of other parts; and the operation step S3 of producing the combustion gas G by supplying fuel to the gas turbine 10. The high-temperature part body 81 includes the base 75 and the coating layer 77 formed on a part of the surface of the base 75. The protective layer 85 is formed on at least a part of the surface of the coating layer 77. The protective layer 85 is formal of a material which is allowed to disappear from the surface of the coating layer 77 under the operation environment of the gas turbine 10. The protective layer 85 disappears from the surface of the coating layer 77 due to the influence of heat of the combustion gas G during the operation step S3.

In this aspect, it is possible to suppress damage of the high-temperature part body 81 during the assembly step S2. Further, when the combustion gas G is once caused to contact the high-temperature part 80 by performing the operation step S3, the protective layer 85 in the high-temperature part 80 can disappear.

EXPLANATION OF REFERENCES

10 Gas turbine
11 Gas turbine rotor
15 Gas turbine casing
16 Intermediate casing
20 Compressor
21 Compressor rotor
22 Rotor shaft
23 Rotor blade row
23*a* Rotor blade
25 Compressor casing
26 Stator vane row
26*a* Stator vane
30 Combustor
31 Burner
32 Transition piece (or combustion cylinder)
33 Cylinder
34 Outlet flange
35 Base
36 Flow path forming portion
37 Coating layer

39*p* Combustion space (or combustion gas flow path)
40 Turbine
41 Turbine rotor
42 Rotor shaft
43 Rotor blade row
43*a* Rotor blade
44 Stator vane row
44*a* Stator vane
45 Turbine casing
46 Split ring
47 Heat insulating ring
48 Vane ring
49 Turbine casing body
49*p* Combustion gas flow path
50 Stator vane
51 Vane body
52 Shroud
52*i* Inner shroud
52*o* Outer shroud
55 Base
56 Flow path forming portion
57 Coating layer
60 Split ring
61 Split ring body
62 Hook portion
65 Base
66 Flow path forming portion
67 Coating layer
70 Outlet seal
71 Body portion
72 Transition piece connection portion
72*a* Mange fitting groove
73 Stator vane connection portion
73*a* Shroud fitting groove
75 Base
76 Flow path forming portion
76*m* Flow path defining surface
76*d* Downstream end surface
76*u* Upstream end surface
77 Coating layer
77*m* Main coating portion
77*d* Downstream coating portion
77*u* Upstream coating portion
80 High-temperature part
81 High-temperature part body
85 Protective layer
85*m* Main protection portion
85*e* End surface protection portion
A Air
F Fuel
G Combustion gas
Ar Axis
Da Axial direction
Dau Axial upstream side
Dad Axial downstream side
Dc Circumferential direction
Dr Radial direction
Dri Radial inside
Dro Radial outside

What is claimed is:

1. A high-temperature part of a gas turbine, which is allowed to be exposed to a combustion gas, the part comprising:

a high-temperature part body which includes a base having a flow path forming portion which defines a part of a combustion gas flow path through which the combustion gas flows, and a coating layer formed on a part of a surface of the base; and a protective layer which is formed on at least a part of a surface of the coating layer, wherein the protective layer is formed of a material which is allowed to disappear from the surface of the coating layer under an operation environment of the gas turbine, wherein the material forming the protective layer is a resin or a material containing a resin as a main component, and the material has a certain level of elasticity, wherein the flow path forming portion includes a flow path defining surface which defines a part of the combustion gas flow path, a downstream end surface which is connected to and extends from an edge of the flow path defining surface on a downstream side to which the combustion gas flows, and an upstream end surface which is connected to and extends from an edge of the flow path defining surface on an upstream side opposite to the downstream side, wherein the coating layer includes a main coating portion which is formed on the flow path defining surface, a downstream coating portion which is formed on the downstream end surface to be connected to the main coating portion, and an upstream coating portion which is formed on the upstream end surface to be connected to the main coating portion, wherein the protective layer includes an end surface protection portion formed on at least one surface of the downstream coating portion and the upstream coating portion and a main surface protection portion formed on a surface of the main coating portion and connected to the end surface protection portion, and wherein the protective layer is configured to protect at least one of a corner formed by the main coating portion and the downstream coating portion and a corner formed by the main coating portion and the upstream coating portion.

2. The high-temperature part according to claim 1, wherein the high-temperature part body is a transition piece, a stator vane, an outlet seal, a split ring or a rotor blade, wherein the transition piece is a component part of a combustor provided in the gas turbine and is a part defining a combustion space in which fuel is combusted and a combustion gas produced by the combustion of the fuel flows, wherein the stator vane is a part disposed in the combustion gas flow path through which the combustion gas flows from the transition piece, wherein the split ring is a part which is disposed adjacent to the stator vane and defines an edge of the combustion gas flow path through which the combustion gas flows from the transition piece, and wherein the rotor blade is a part which is axially adjacent to the stator vane and is disposed in the combustion gas flow path through which the combustion gas flows.

3. A gas turbine comprising:

the high-temperature part of the gas turbine according to claim 1; and a plurality of other parts which are not exposed to a combustion gas, wherein the plurality of other parts include all parts constituting a compressor of the gas turbine and parts forming an outer shape of a turbine of the gas turbine.

4. A method of operating a high-temperature part of a gas turbine allowed to be exposed to a combustion gas, the method comprising:

a preparation step of preparing a high-temperature part including a high-temperature part body and a protective layer formed on at least a part of a surface of the high-temperature part body;

an assembly step of assembling a gas turbine by using the high-temperature part and a plurality of other parts; and an operation step of producing a combustion gas by supplying fuel to the gas turbine, wherein the high-temperature part body includes a base having a flow path forming portion which defines a part of a combustion gas flow path through which the combustion gas flows, and a coating layer formed on a part of a surface of the base, wherein the protective layer is formed on at least a part of a surface of the coating layer, wherein the protective layer is formed of a material which is allowed to disappear from the surface of the coating layer under an operation environment of the gas turbine, the material forming the protective layer is a resin or a material containing a resin as a main component, and the material has a certain level of elasticity, wherein the flow path forming portion includes a flow path defining surface which defines a part of the combustion gas flow path, a downstream end surface which is connected to and extends from an edge of the flow path defining surface on a downstream side to which the combustion gas flows, and an upstream end surface which is connected to and extends from an edge of the flow path defining surface on an upstream side opposite to the downstream side, wherein the coating layer includes a main coating portion which is formed on the flow path defining surface, a downstream coating portion which is formed on the downstream end surface to be connected to the main coating portion, and an upstream coating portion which is formed on the upstream end surface to be connected to the main coating portion, wherein the protective layer includes an end surface protection portion which is formed on at least one surface of the downstream coating portion and the upstream coating portion and a main protection portion which is formed on a surface of the main coating portion to be connected to the end surface protection portion, wherein the protective layer is configured to protect in a periphery on at least one of a corner between the main coating portion and the downstream coating portion and a corner between the main coating portion and the upstream coating portion, and wherein the protective layer disappears from the surface of the coating layer due to the influence of heat of the combustion gas during the operation step.

* * * * *